(12) United States Patent
Ozaki et al.

(10) Patent No.: US 11,091,950 B2
(45) Date of Patent: Aug. 17, 2021

(54) DOOR CONTROL DEVICE AND DOOR CONTROL METHOD

(71) Applicant: FUJI ELECTRIC CO., LTD., Kanagawa (JP)

(72) Inventors: Satoru Ozaki, Tokyo (JP); Kenji Fujita, Chiba (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 275 days.

(21) Appl. No.: 16/364,696

(22) Filed: Mar. 26, 2019

(65) Prior Publication Data

US 2019/0360255 A1 Nov. 28, 2019

(30) Foreign Application Priority Data

May 25, 2018 (JP) .............................. JP2018-100211

(51) Int. Cl.
*E05F 15/00* (2015.01)
*E05F 15/73* (2015.01)
*B61D 19/02* (2006.01)
*E05F 15/40* (2015.01)

(52) U.S. Cl.
CPC ............ *E05F 15/73* (2015.01); *B61D 19/026* (2013.01); *E05F 15/40* (2015.01); *E05Y 2900/51* (2013.01)

(58) Field of Classification Search
CPC . E05F 15/53; E05F 15/54; E05F 15/42; E05F 15/73; E05F 15/40; E05F 15/41; E05F 2017/005; E05Y 2400/36; E05Y 2400/56; E05Y 2400/564; E05Y 2400/40; E05Y 2201/24; E05Y 2900/51; E05Y 2800/00; E05Y 2201/214; B66B 13/26; B66B 13/143; B66B 13/24; B66B 13/14; H02H 7/0854; H02H 7/0851; H02H 7/0858; B61D 19/026; B61D 19/02; B61L 15/0081
USPC ........ 49/118, 28, 26, 29, 370; 187/313, 316, 187/317, 391, 393; 318/466, 467, 468, 318/469, 470
See application file for complete search history.

(56) References Cited

U.S. PATENT DOCUMENTS

| | | | | |
|---|---|---|---|---|
| 5,131,506 A | * | 7/1992 | Mizuno | G05D 3/12 187/316 |
| 5,530,329 A | * | 6/1996 | Shigematsu | H02H 7/0851 318/469 |
| 5,689,160 A | * | 11/1997 | Shigematsu | H02H 7/0851 318/281 |
| 5,780,987 A | * | 7/1998 | Fitzgibbon | E05F 15/668 318/16 |

(Continued)

FOREIGN PATENT DOCUMENTS

JP 2012-176708 9/2012

*Primary Examiner* — Chi Q Nguyen
(74) *Attorney, Agent, or Firm* — IPUSA, PLLC

(57) ABSTRACT

A door control device includes: a speed control unit configured to perform speed control of an electric motor that drives a door; a speed detection unit configured to detect a speed of the door; and an obstruction detection unit configured to detect obstruction between the door and a door pocket, upon a value of the speed of the door detected by the speed detection unit decreasing by a first predetermined value or more with respect to a speed command value in the speed control during a door opening operation of the door.

16 Claims, 12 Drawing Sheets

(56) References Cited

U.S. PATENT DOCUMENTS

| | | | | |
|---|---|---|---|---|
| 6,225,904 B1* | 5/2001 | Jaffe | .................... | F25D 23/021 |
| | | | | 340/545.3 |
| 6,445,152 B1* | 9/2002 | Calamatas | ............ | B61D 19/02 |
| | | | | 318/256 |
| 6,449,152 B1* | 9/2002 | Lin | .................... | H01L 23/4006 |
| | | | | 165/80.3 |
| 9,056,749 B2* | 6/2015 | Utsunomiya | ........... | B66B 13/26 |
| 10,494,852 B2* | 12/2019 | Fujita | ................. | E05B 65/0882 |
| 2003/0154656 A1* | 8/2003 | Fitzgibbon | ............ | E05F 15/668 |
| | | | | 49/26 |
| 2005/0140321 A1* | 6/2005 | Wojciak, Jr. | ....... | G07C 9/00182 |
| | | | | 318/452 |
| 2009/0272605 A1* | 11/2009 | Utsunomiya | ......... | B66B 13/143 |
| | | | | 187/316 |
| 2020/0361324 A1* | 11/2020 | Evans | .................... | B60P 3/007 |

* cited by examiner

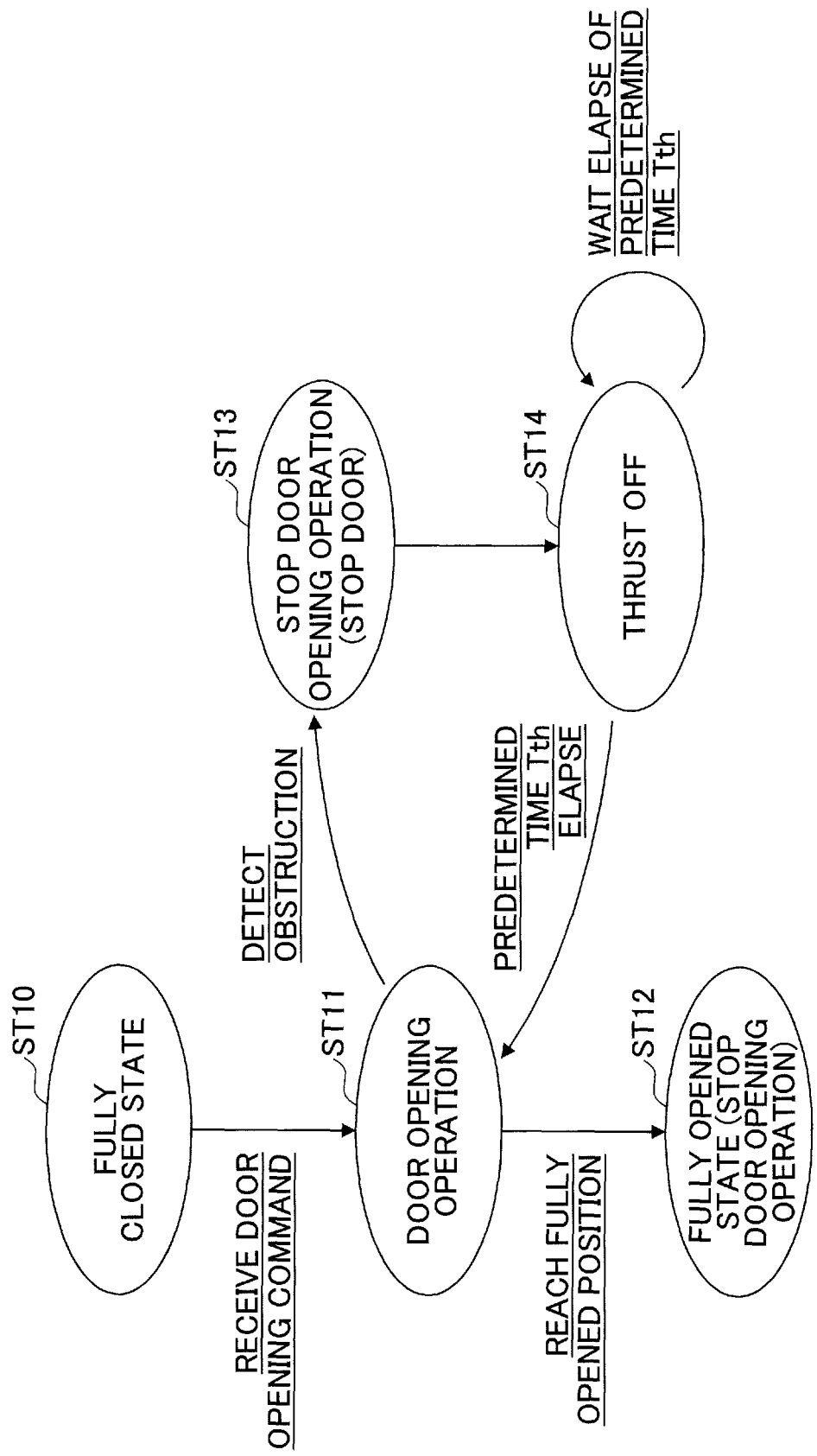

DOOR CONTROL DEVICE AND DOOR CONTROL METHOD

CROSS-REFERENCE TO RELATED APPLICATION

The present application is based on and claims priority to Japanese Priority Application No. 2018-100211 filed on May 25, 2018, the entire contents of which are hereby incorporated by reference.

BACKGROUND OF THE INVENTION

1. Field of the Invention

The present invention relates to a door control device and a door control method.

2. Description of the Related Art

For example, Patent Document 1 discloses a door control device that performs control, during a door closing operation of doors provided on side surfaces of respective cars that constitute a railroad train, when sandwiching of an object (for example, clothes, a personal item, or the like of a passenger, hereinafter referred to as "obstruction") between two door panels occurs, to control door thrust so that the passenger or the like can pull out the obstructing object.

RELATED-ART DOCUMENTS

Patent Document

[Patent Document 1] Japanese Laid-open Patent Publication No. 2012-176708

However, even during an opening operation of a door, due to the door opening operation of the door, there is a possibility that obstruction by being dragged between a door panel and a door pocket occurs. Such obstruction during the door opening operation may occur at any point of time from the beginning of opening the door to the end of opening the door. Therefore, as in a case of obstruction during a door closing operation, by a method of focusing on a position of the door such as not reaching the fully closed position due to an obstructing object, it is difficult for a door control device to detect the obstruction during a door opening operation. Also, when obstruction occurs during a door opening operation, the door may continue to operate while dragging the obstructing object. Therefore, as in a case of obstruction during a door closing operation, by a method of focusing on stopping of the door such as stopping before the door is fully closed, it is difficult to detect obstruction during a door opening operation. Thus, it is impossible to use a detection method for a case of obstruction during a door closing operation, and a detection method for detecting an occurrence of obstruction during a door opening operation is desired.

Hence, in view of the above, an object of the present invention is to provide a door control device and a door control method that can detect obstruction between a door and a door pocket during a door opening operation.

SUMMARY OF THE INVENTION

In view of the object described above, an embodiment of the present invention provides a door control device including: a speed control unit configured to perform speed control of an electric motor that drives a door; a speed detection unit configured to detect a speed of the door; and an obstruction detection unit configured to detect obstruction between the door and a door pocket, upon a value of the speed of the door detected by the speed detection unit decreasing by a first predetermined value or more with respect to a speed command value in the speed control during a door opening operation of the door.

Also, another embodiment of the present invention provides a door control device including: a speed control unit configured to perform speed control of an electric motor that drives a door; a drag force estimation unit configured to estimate a drag force that is a cause of a variation in the door speed; and an obstruction detection unit configured to detect obstruction between the door and a door pocket, upon the drag force estimated by the drag force estimation unit exceeding a second predetermined value during a door opening operation of the door.

Also, another embodiment of the present invention realizes a door control method.

According to an embodiment as described above, it is possible to provide door control device and a door control method that can detect obstruction between a door and a door pocket during a door opening operation.

BRIEF DESCRIPTION OF THE DRAWINGS

FIG. 3B is a state transition diagram relating to a state of the door behavior corresponding to the first example of the door opening control by the door control device;

DETAILED DESCRIPTION OF THE EMBODIMENTS

In the following, embodiments for implementing the invention will be described with reference to the accompanying drawings.

First Embodiment

First, a first embodiment of the present invention will be described.

[Configuration of Door Control System]

First, with reference to FIG. 1, a configuration of a door control system 1 including a door control device 20 according to the first embodiment will be described.

Figure 1:
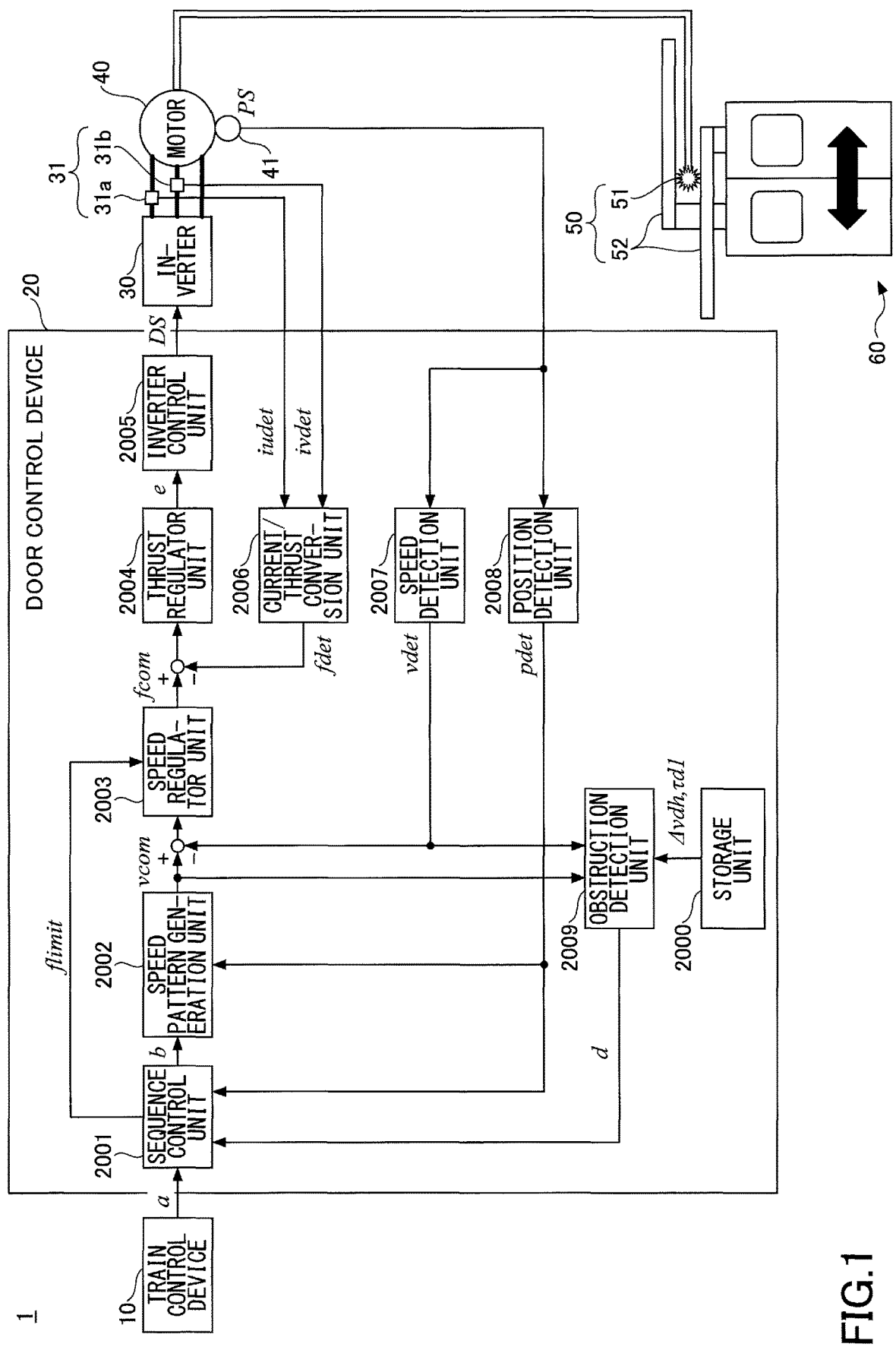
FIG. 1 is a diagram illustrating an example of a configuration of a door control system including a door control device according to a first embodiment.

FIG. 1 is a diagram illustrating an example of a configuration of the door control system 1 including the door control device 20 according to the first embodiment.

Note that, in the figure, a double line indicates a power transmission system, a thick solid line indicates a power supply system, and a thin solid line indicates a control system.

For example, the door control system 1 is mounted on a car such as a railroad car (train), and includes a train control device 10, a door control device 20, an inverter 30, a current sensor 31, a motor 40, an encoder 41, a door opening/closing mechanism 50, and a door 60. As the car on which the door control system 1 is mounted, for example, not only a car such as an electric train on which power is mounted but also a car on which no power is mounted (a passenger car) may be included. Hereinafter, the car on which the door control system 1 is mounted is simply referred to as the "car".

The train control device 10 performs control relating to an operation of the car. In a case in which a plurality of cars are connected in a train, one train control device 10 is provided for an operator's cabin of the first car and one train control device 10 is provided for a conductor's room of the last car. Also, in a case where the car is a car that can be operated as a single-car train, for example, the train control device 10 is provided for each of an operator's cabin and a conductor's room located at both ends in the traveling direction of the car.

The functions of the train control device 10 may be realized as suited by hardware, software, or a combination of hardware and software. For example, the train control device 10 may be constituted mainly by a computer including a CPU (Central Processing Unit), a RAM (Random Access Memory), a ROM (Read Only Memory), a nonvolatile auxiliary storage device, various interfaces for communication, and the like. This similarly applies to the door control device 20.

For example, in response to an operation performed by a train conductor on a switch for opening/closing the door 60 that is not illustrated, the train control device 10 outputs, to the door control device 20, a door opening command that is a command to open the door 60 or a door closing command that is a command to close the door 60.

In response to the door opening command received from the train control device 10, the door control device 20 performs controls to open the door 60 in the fully closed state (hereinafter, referred to as "door opening control"). In response to the door closing command received from the train control device 10, the door control device 20 performs controls to close the door 60 in the fully opened state (hereinafter, referred to as "door closing control"). For example, the door control device 20 includes a sequence control unit 2001, a speed pattern generation unit 2002, a speed regulator unit 2003, a thrust regulator unit 2004, an inverter control unit 2005, a current/thrust conversion unit 2006, a speed detection unit 2007, a position detection unit 2008, and an obstruction detection unit 2009, as functional units realized by executing on a CPU one or more programs stored in a ROM, a non-volatile auxiliary storage device, or the like. Further, the door control device 20 includes, for example, a storage unit 2000 as a storage area defined in a nonvolatile internal memory such as an auxiliary storage device.

The inverter 30 supplies driving power to the motor 40 to drive the motor 40 under control of the door control device 20 (specifically, the inverter control unit 2005, which will be described later below). For example, the inverter 30 converts DC power that is supplied from a predetermined supply device mounted on the car 1 into three-phase AC power and supplies the three-phase AC power to the motor 40.

The current sensor 31 detects currents that are supplied from the inverter 30 to the motor 40. Among three power lines respectively corresponding to the U phase, the V phase, and the W phase (hereinafter, respectively referred to as the "U phase line", the "V phase line", and the "W phase line") connected between the inverter 30 and the motor 40, the current sensor 31 includes, for example, current sensors 31a and 31b respectively provided on the U phase line and the V phase line that are two lines. Each of the current sensors 31a and 31b may be a contact type sensor or may be a non-contact type sensor such as a current transformer type or a Hall element type. Current detection signals iudet and ivdet corresponding to the currents of the U-phase line and the V-phase line, which are detected by the current sensors 31a and 31b, are input to the door control device 20.

The motor 40 is, for example, a rotary three-phase AC electric motor, and adds thrust for an opening/operation to the door 60 via the door opening/closing mechanism 50.

Note that the motor 40 is not limited to a rotary type, but may be, for example, a linear motor as long as being able to electrically drive the door 60. Also, two motors 40 may be provided corresponding to two respective door panels of the door 60, which will be described later below.

The encoder 41 is, for example, attached to a casing of the motor 40 or the like, and is a known detector that detects a rotational angle (rotational position) of the motor 40. A rotational position signal PS corresponding to the rotational position of the motor 40, which is detected by the encoder 41, is input to the door control device 20.

The door opening/closing mechanism 50 is a mechanism unit that transmits an output (thrust) of the motor 40 to the door 60 and realizes an opening and closing operation of the door 60. The door opening/closing mechanism 50 includes, for example, a pinion gear portion 51 and rack gear portions 52 that mesh with the pinion gear portion 51. The pinion gear portion 51 and the rack gear portions 52 constitute a rack and pinion that converts drive force (rotational motion) of the motor 40 into linear motion of the door 60. Note that a linear motor may be applied instead of the pinion gear portion 51 and the rack gear portions 52.

The door 60 is provided, for example, in each of one or more openings on the left and right side surfaces with reference to the traveling direction of the body of the car. The door 60 is, for example, a sliding combination door that performs opening and closing operations in a manner in which two door panels move in opposite directions, and at the time of opening, the two door panels are stored in door pockets provided in a body of the car.

In response to the door opening command a or the door closing command a, which is input from the train control device 10, and the door panel position information pdet corresponding to the position of the door panels of the door 60 detected by the position detection unit 2008, the sequence control unit 2001 performs sequence control related to the door opening operation or the door closing operation of the door 60.

For example, the sequence control unit 2001 starts sequence control related to the door opening operation of the door 60 in response to the door opening command a input from the train control device 10. Then, based on the door panel position information pdet, while grasping (sensing) a progress state of the door opening operation of the door 60, the sequence control unit 2001 outputs a door control command b having the contents according to a predefined sequence, and controls the door opening operation of the door 60 until the door 60 reaches the fully opened position.

Also, for example, during a door closing operation of the door 60, in a case where the obstruction detection unit 2009 detects that a sandwiching (getting stuck/getting caught of an object such as clothing or a personal item of a passenger) is dragged between a door panel and a door pocket of the door 60, (specifically, in a case where an obstruction signal d indicating that obstruction is detected is received), the sequence control unit 2001 controls the door 60 to handle the obstruction (hereinafter, referred to as "obstruction handling control"). In the following, unless otherwise noted, "obstruction" means obstruction between a door panel and the door pocket of the door 60 during a door opening operation. Details of the obstruction handling control will be described later below (see FIGS. 3 to 6).

Also, for example, at the time of starting sequence control relating to the door opening operation of the door 60, the sequence control unit 2001 outputs, to the speed regulator unit 2003, a limit value (hereinafter, referred to as "thrust limit value") flimit of the thrust for the door 60 output from the motor 40. For example, the thrust limit value flimit is set to a predetermined value f1 defined in advance based on the maximum output and the rated output the motor 40 (flimit=f1).

Based on the door panel position information pdet, while grasping (sensing) the position of the door panels, the speed pattern generation unit 2002 outputs the speed command value vcom corresponding to the position of the door panels based on a map, a conversion formula, or the like.

The speed control unit 2003 (which is an example of a speed regulator unit) is a controller that performs speed control of the motor 40 based on the speed command value vcom. Specifically, the speed regulator unit 2003 performs speed feedback control calculation so as to reduce a difference (deviation) between the speed command value vcom and a value Vdet of the speed of the door 60 detected by the speed detection unit 2007 (hereinafter referred to as "speed detection value"), and outputs a thrust command value fcom. At this time, the speed regulator unit 2003 makes the thrust command value fcom equal to or less than the thrust limit value flimit. That is, when the thrust command value fcom, calculated to reduce the difference between the speed command value vcom and the speed detection value vdet, exceeds the thrust limit value flimit, the speed regulator unit 2003 corrects the value of the thrust command value fcom to the thrust limit value flimit to output it. To the speed regulator unit 2003, a controller for feedback control such as, for example, a PID (Proportional Integral Differential) controller may be applied as desired. This similarly applies to the thrust regulator unit 2004.

The thrust regulator unit 2004 (an example of a thrust control unit) is a controller (controller) that controls the thrust of the motor 40 based on the thrust command value fcom. Specifically, the thrust regulator unit 2004 performs thrust feedback control calculation so as to reduce a difference (deviation) between the thrust command value fcom and a detection value fdet of thrust (hereinafter. referred to as "thrust detection value"), which is input from the current/ thrust conversion unit 2006 and is added from the motor 40 to the door 60, and outputs an operation amount e with respect to inverter control unit 2005.

The inverter control unit 2005 controls the inverter 30 based on the operation amount e, which is input from the thrust regulator unit 2004. Specifically, the inverter control unit 2005 outputs, based on the operation amount e, a drive signal DS (for example, a PWM (Pulse Width Modulation) signal) for driving the inverter 30 to the inverter 30.

Based on the current detection signals iudet and ivdet that are input from the current sensors 31a and 31b, using a predetermined conversion formula, a map, or the like, the current/thrust conversion unit 2006 converts the current detection values of the U-phase line and the V-phase line, which are detected by the current sensors 31a and 31b, into a thrust detection value fdet of the motor 40.

Based on the rotational position signal PS that is input from the encoder 41, the speed detection unit 2007 differentiates the position information on the door to detect the speed of the door 60 and outputs the speed detection value vdet.

The position detection unit 2008 detects the position of the door 60 (door panels) based on the rotational position signal PS, which is input from the encoder 41, and outputs the door panel position information pdet.

The obstruction detection unit 2009 detects obstruction during a door opening operation of the door 60. When detecting obstruction, the obstruction detection unit 2009 outputs an obstruction signal d to the sequence control unit 2001.

In the storage unit 2000, various kinds of information used for calculation by the respective functional units 2001 to 2009 are stored. Each of the functional units 2001 to 2009 reads necessary information from the storage unit 2000 as appropriate.

[Detection Method of Obstruction During Door Opening Operation]

Next, with reference to FIG. 2, a method of detecting obstruction during a door opening operation of the door 60 by the door control device 20 (the obstruction detection unit 2009) will be described.

Figure 2:
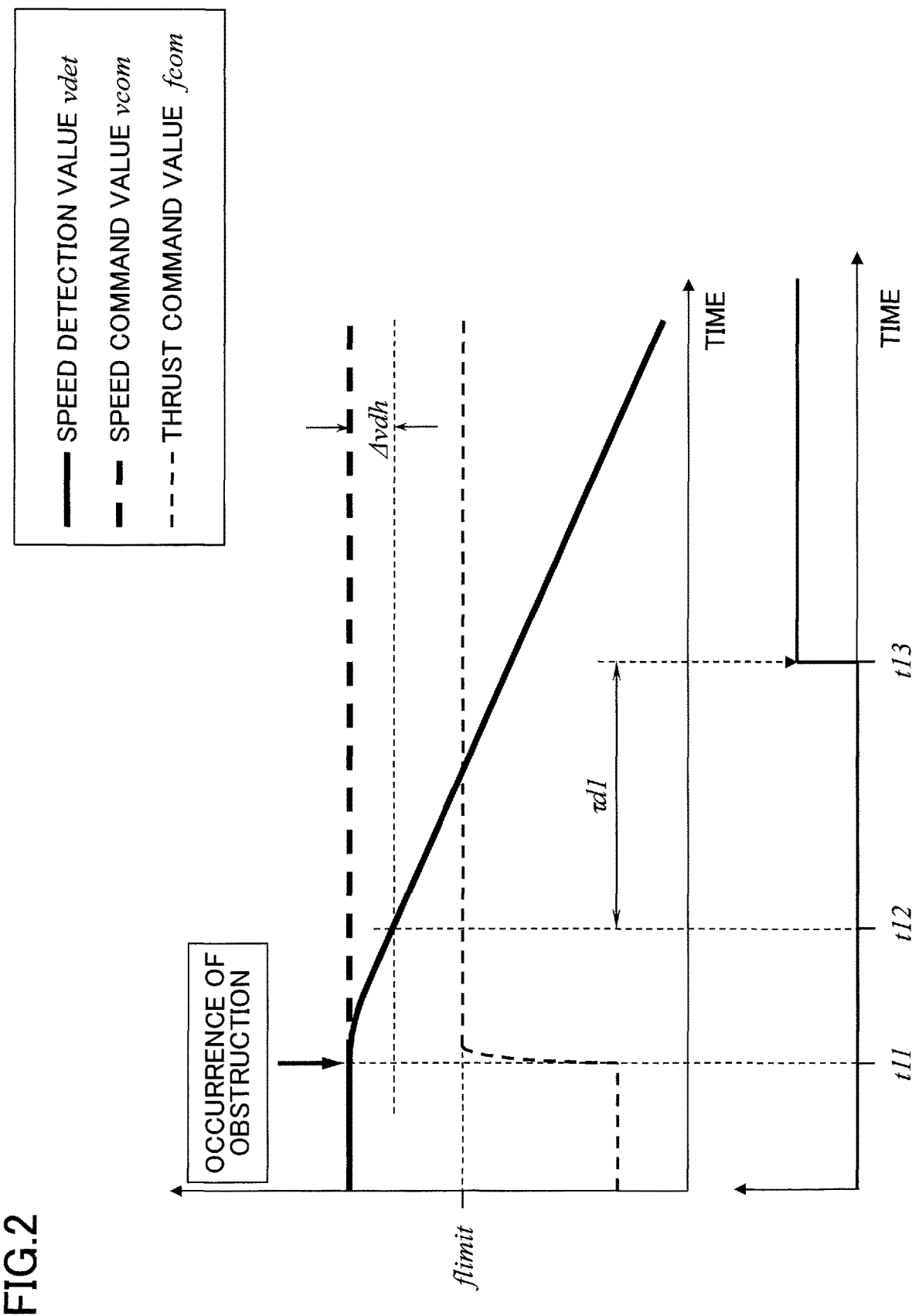
FIG. 2 is a timing chart that describes a method of detecting obstruction by the door control device according to the first embodiment.

FIG. 2 is a diagram that describes a method of detecting obstruction by the door control device 20 (the obstruction detection unit 2009). Specifically, the upper part of FIG. 2 is a graph illustrating, when obstruction occurs, changes of a speed detection value vdet, a speed command value vcom, and a thrust command value fcom with respect to time. The lower part of FIG. is a graph illustrating a change of an output state (presence or absence of output) of an obstruction signal d with respect to time.

As illustrated in FIG. 2, obstruction occurs at time t11.

When the obstruction occurs, not only a steady-state drag force, which steadily acts and includes a kinetic friction force and the like, but also a disturbance drag force corresponding to the obstruction act on the door 60. Therefore, the disturbance drag force corresponding to the obstruction lowers the speed of the door 60, and the speed detection value vdet starts to decrease after time t11.

At this time, in order to reduce the difference (deviation) between the speed detection value vdet and the speed command value vcom, the speed regulator unit 2003 increases the thrust command value fcom. However, as described above, since the thrust command value fcom is limited to the thrust limit value flimit or less, the thrust command value fcom reaches the maximum and saturates.

As a result, upon the sum of the disturbance drag force due to the obstruction and the stationary drag force that steadily occurs, such as the kinetic friction force, exceeding the thrust limit value flimit, that state continues and the speed decrease of the door further progresses. That is, the speed detection value vdet continues to decrease after time t11.

Therefore, upon the speed detection value Vdet decreasing by a predetermined speed decrease threshold value Δvdh (>0) or more with respect to the speed command value vcom, the obstruction detection unit 2009 can detect the obstruction occurred at the door 60 (time t12).

Obstruction during a door opening operation may occur at any point of time from the beginning of opening the door 60 to the end of opening the door 60. Therefore, as in a case of obstruction during a door closing operation, by a method of focusing on a position of the door 60 such as not reaching the fully closed position due to an obstructing object, it is difficult for the door control device 20 to detect the obstruction during a door opening operation. Also, when obstruction occurs during a door opening operation, the door 60 may continue to operate while dragging the obstructing object. Therefore, as in a case of obstruction during a door closing operation, by a method of focusing on stopping of the door 60 such as stopping before the door is fully closed, it is difficult to detect obstruction during a door opening operation.

With respect to the above, according to the present embodiment, as described above, by focusing on a decrease in the speed of the door 60 corresponding to a disturbance drag force against the door 60 caused by obstruction, the door control device 20 can detect the obstruction.

The speed decrease threshold value Δvdh (an example of a first predetermined value) for detecting obstruction is defined, for example, based on the magnitude of a speed command value vcom. This is because there is a possibility that as the speed command value vcom increases, a transient speed fluctuation range in the speed control system increases. Also, the speed decrease threshold value Δvdh is defined, for example, based on a steady-state error (steady-state deviation) in the speed control system of the door 60 by the door control device 20. This is because the difference between a speed command value vcom and a speed detection value vdet, which is compared with the speed decrease threshold value Δvdh, includes a steady-state error. Also, the speed decrease threshold value Δvdh is defined, for example, based on a disturbance response in the speed control system of the door 60 by the door control device 20 (a transient response when a temporary speed fluctuation occurs with respect to a disturbance input). This is because it is necessary to distinguish a case where a speed fluctuation occurs temporarily based on a disturbance input from a case where a continuous speed decrease occurs due to obstruction. Also, the speed decrease threshold value Δvdh is defined, for example, based on the magnitude of a speed fluctuation in the speed control system of the door 60 by the door control device 20. This is because the difference between a speed command value vcom and a speed detection value vdet, which is compared with the speed decrease threshold value Δvdh, includes a speed fluctuation assumed in the speed control system. The obstruction detection unit 2009 may define the speed decrease threshold value Δvdh based on at least one of a magnitude of the speed command value vcom, a steady-state error of the speed control system, a disturbance response of the speed control system, and a magnitude of a speed fluctuation of the speed control system. Specifically, the obstruction detection unit 2009 may define the speed decrease threshold value Δvdh based on information such as a map or a table prepared in advance in consideration of at least one of a magnitude of the speed command value vcom, a steady-state error of the speed control system, a disturbance response of the speed control system, and a magnitude of a speed fluctuation of the speed control system. As a result, erroneous detection of obstruction is reduced.

Also, as illustrated in FIG. 2, the obstruction detection unit 2009 may determine, based on a time element τd1 (>0), that the speed detection value vdet decreases by the speed decrease threshold value Δvdh or more with respect to the speed command value vcom, and may detect obstruction that occurs at the door 60. Here, the time element τd1 is a delay time or a waiting time until a detection of obstruction occurred at the door 60 is confirmed. This similarly applies to a time element τd2, which will be described later below. That is, after the speed detection value vdet decreases by the speed decrease threshold value Δvdh or more with respect to the speed command value vcom, when such a state continues for the time element τd1 or more, the obstruction detection unit 2009 may detect the obstruction occurred at the door 60 (time t13). As a result, because a temporary speed fluctuation of the door 60 is eliminated, erroneous detection of obstruction is further reduced.

The time element τd1 (an example of a first predetermined time) for detecting obstruction may be, similarly to the speed decrease threshold value Δvdh, defined based on at least one of a magnitude of the speed command value vcom, a steady-state error of the speed control system, a disturbance response of the speed control system, and a magnitude of a speed fluctuation of the speed control system. That is, the obstruction detection unit 2009 may define the time element τd1 based on information such as a map or a table prepared in advance in consideration of at least one of a magnitude of the speed command value vcom, a steady-state error of the speed control system, a disturbance response of the speed control system, and a magnitude of a speed fluctuation of the speed control system. As a result, erroneous detection of obstruction is further reduced.

[Details of Obstruction Handling Control]

Next, with reference to FIGS. 3 to 6, details of obstruction handling control will be described.

Figure 3A:
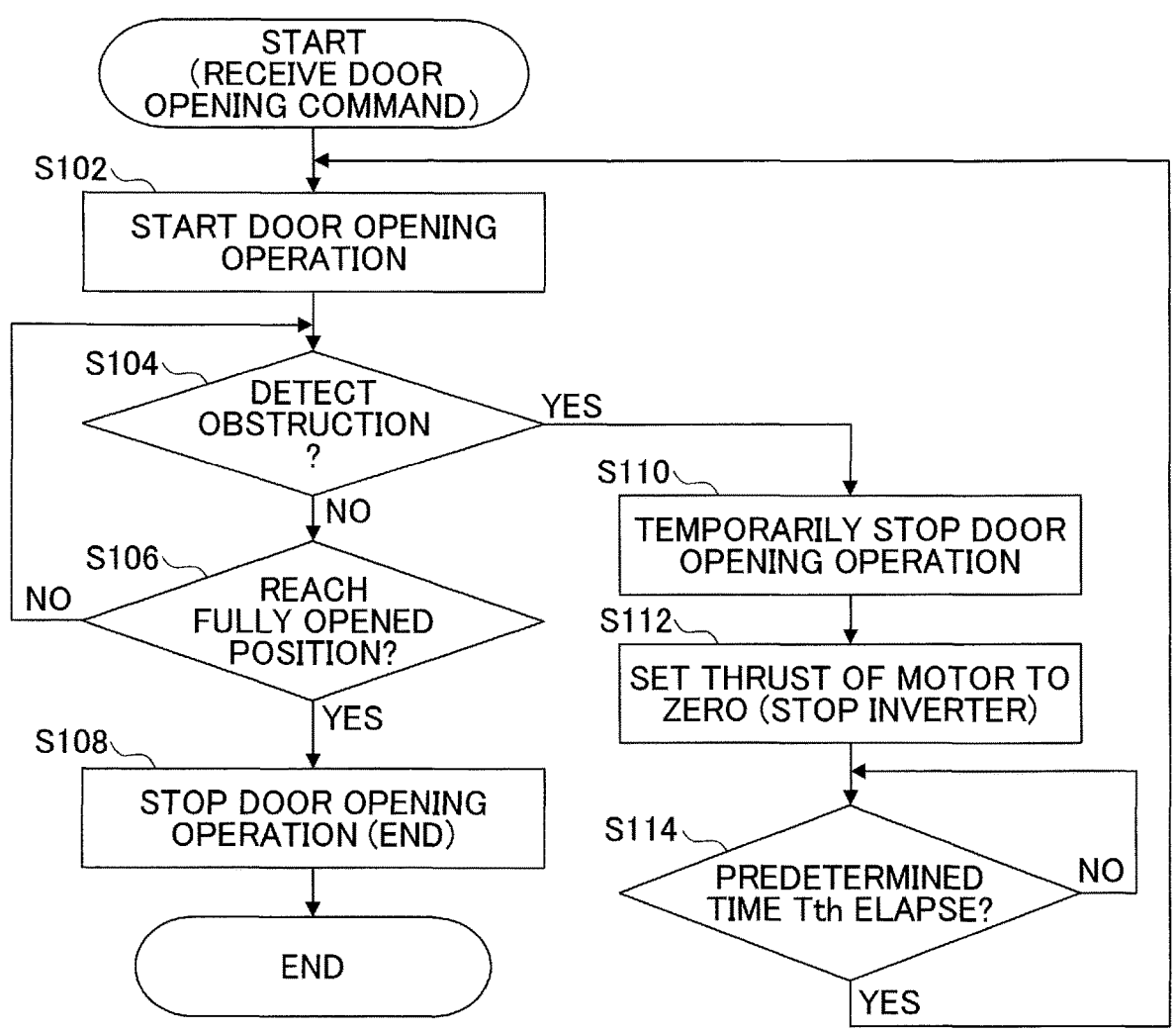
FIG. 3A is a flowchart schematically illustrating a first example of the door opening control by the door control device.

FIG. 3 (FIG. 3A and FIG. 3B) are diagrams that describe a first example of door opening control by the door control device 20. Specifically, FIG. 3A is a flowchart schematically illustrating the first example of the door opening control by the door control device 20. FIG. 3B is a state transition diagram relating to a movement state of the door 60 corresponding to the first example of the door opening control by the door control device 20. The flowchart of FIG. 3A is started, for example, upon receiving a door opening command a from the train control device 10. Hereinafter, this similarly applies to the flowcharts of FIGS. 4A, 5A, and 6A.

As illustrated in FIG. 3A, in step S102, the door control device 20 (sequence control unit 2001) starts a door opening operation of the door 60 in response to receiving a door opening command a. Specifically, by outputting a door control command b to the speed pattern generation unit 2002, the sequence control unit 2001 starts the door opening operation of the door 60 based on speed feedback control by the speed regulator unit 2003 and thrust feedback control by the thrust regulator unit 2004. As a result, as illustrated in FIG. 3B, the door 60 transitions from the fully closed state ST10 to the state ST11 corresponding to the door opening operation.

In step S104, the sequence control unit 2001 determines whether or not obstruction has been detected by the obstruction detection unit 2009. Specifically, the sequence control unit 2001 determines whether or not an obstruction signal d has been output from the obstruction detection unit 2009. When obstruction has not been detected by the obstruction detection unit 2009, the sequence control unit 2001 causes the process to proceed to step S106. When obstruction has been detected, the sequence control unit 2001 causes the process to step S110.

In step S106, based on door panel position information pdet, the sequence control unit 2001 determines whether or not the door panels of the door 60 have reached a predetermined fully opened position. When the door panels of the door 60 have reached the fully opened position, the sequence control unit 2001 causes the process to proceed to step S108. When the door panels of the door 60 have not reached the fully opened position, the sequence control unit 2001 causes the process to return to step S104 and repeats the processes of steps S104 and S106.

In step S108, the sequence control unit 2001 stops (ends) the door opening operation of the door 60 in response to the door panels of the door 60 reaching the fully opened position. The sequence control unit 2001 stops the inverter 30, for example. Then, the door control device 20 ends the current process. As a result, as illustrated in FIG. 3B, the door 60 transitions from the state ST11 corresponding to the door opening operation to the fully opened state ST12, and stops the door closing operation (that is, the door 60 stops in the fully opened state).

On the other hand, in step S110, in response to detecting the obstruction, the sequence control unit 2001 temporarily stops the door opening operation of the door 60, that is, temporarily stops the door 60. As a result, as illustrated in FIG. 3B, the door 60 transitions from the state ST11 corresponding to the door opening operation to the state ST13 in which the door opening operation of the door 60 is stopped.

Then, in step S112, the sequence control unit 2001 sets the thrust of the motor 40 to zero. Specifically, the sequence control unit 2001, for example, outputs a stop signal to the inverter 30 to temporarily stop the inverter 30. Also, for example, the sequence control unit 2001 may perform zero thrust control (zero torque control) of the motor 40 by outputting the thrust limit value flimit, to which zero is set, to the speed regulator unit 2003 to forcibly set the thrust command value fcom, which is output from the speed regulator unit 2003, to zero. As a result, as illustrated in FIG. 3B, the door 60 transitions to a state ST14 in which the added thrust is off (zero).

In step S114, the sequence control unit 2001 determines whether or not the predetermined time Tth (an example of a third predetermined time) has elapsed after the process of step S112 (after setting the thrust of the motor 40 to zero). When the predetermined time Tth has not elapsed, the sequence control unit 2001 waits until the predetermined time Tth elapses. When the predetermined time Tth has elapsed, the sequence control unit 2001 returns the process to step S102. As a result, as illustrated in FIG. 3B, the door 60 transitions (returns) from the state ST14, in which the added thrust is off (zero), to the state ST11 corresponding to the door opening operation.

As described above, in this example, when obstruction is detected by the obstruction detection unit 2009, the sequence control unit 2001 (an example of an obstruction handling control unit) stops the door opening operation of the door 60 and performs, during the predetermined time Tth, obstruction handling control of setting the thrust of the motor 40 to zero. As a result, a passenger or the like of the car can relatively easily remove an obstructing object (for example, clothes, a personal item, or the like) in a manner of being dragged between the door panel and the door pocket, as compared with a case where thrust in the opening direction is added to the door 60.

Also, when obstruction occurs during a door closing operation, by moving the two door panels of the door 60 in the opening direction by a predetermined distance, a passenger or the like can safely remove the object obstructing the door 60. However, when obstruction occurs during a door opening operation, using a similar method may cause a safety problem. Specifically, when the door 60 starts a door opening operation, a passenger or the like expects an ensuing state in which the door 60 is opened, and starts entering the car via the door 60 or starts getting off the car. Therefore, if the door 60 temporarily moves in the closing direction during the door opening operation, there is a possibility that a passenger or the like, who expects the state in which the door 60 is opened and who is moving toward the door 60, hits the door panels.

With respect to the above, in this example, since the door 60 does not move in the closing direction, the door control device 20 can secure the safety of a passenger or the like.

That is, the door control device 20 in this example can support a passenger to relatively easily remove an obstructing object between a door panel and a door pocket while securing the safety of the passenger or the like.

Figure 4A:
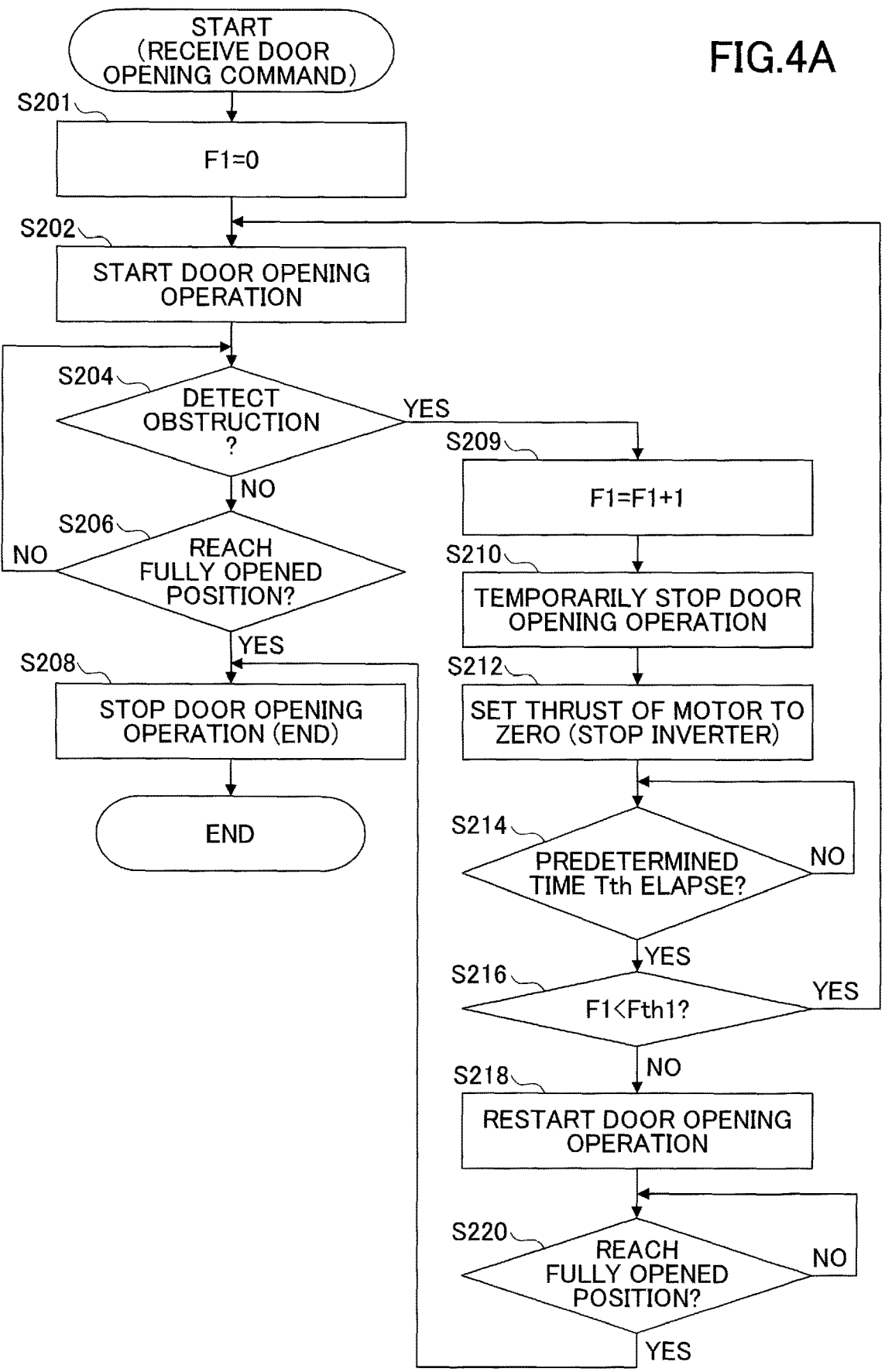
FIG. 4A is a flowchart schematically illustrating a second example of the door opening control by the door control device.
Figure 4B:
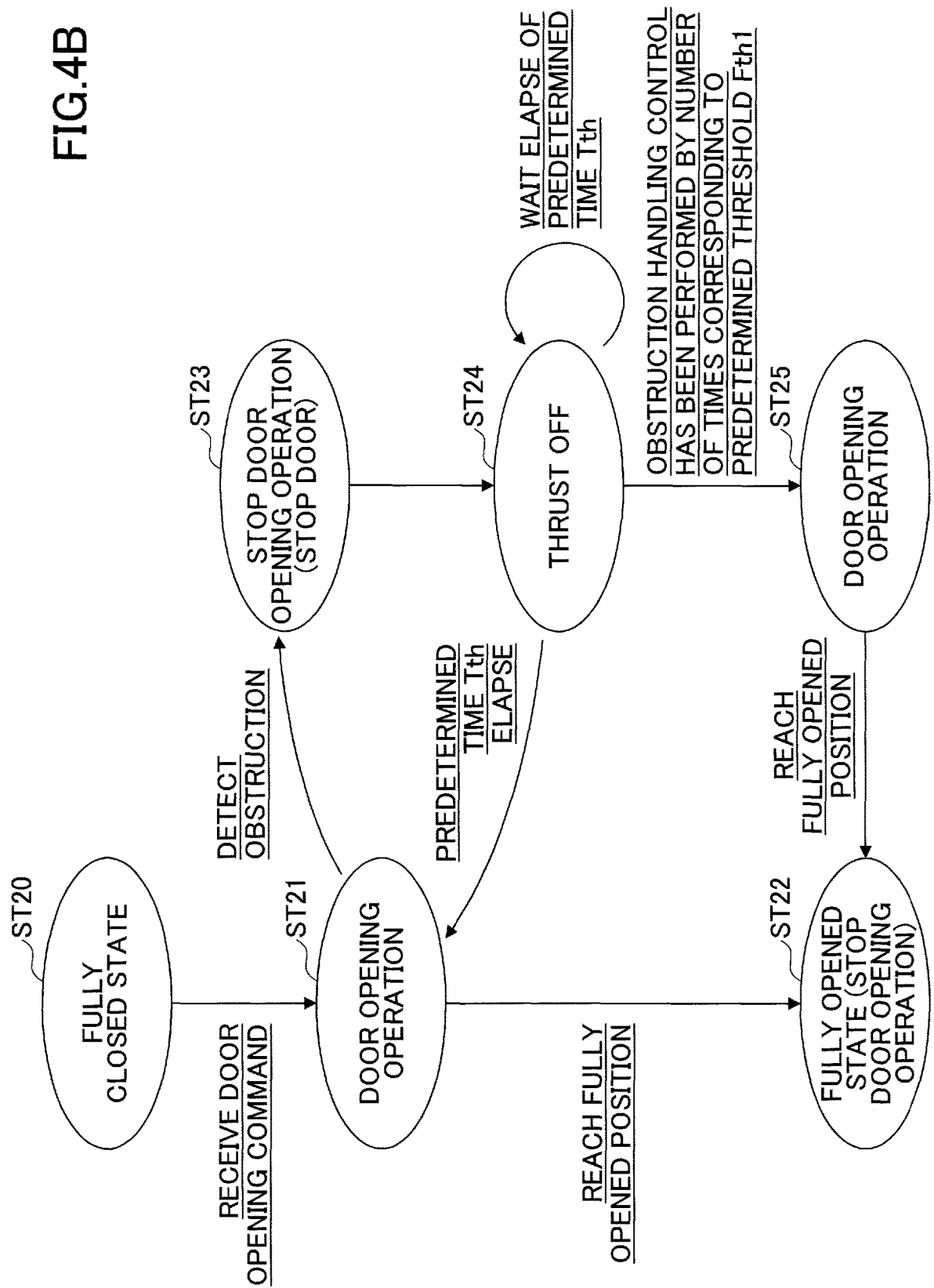
FIG. 4B is a state transition diagram relating to a state of the door behavior corresponding to the second example of the door opening control by the door control device.

Next, FIG. 4 (FIG. 4A and FIG. 4B) are diagrams that describe a second example of door opening control by the door control device 20. Specifically, FIG. 4A is a flowchart schematically illustrating the second example of the door opening control by the door control device 20. FIG. 4B is a state transition diagram relating to a movement state of the door 60 corresponding to the second example of the door opening control by the door control device 20.

Note that an obstruction counter F1 is a counter indicating the number of times by which obstruction handling control has been executed in response to detecting sandwiching of an object (obstruction) by the obstruction detection unit 2009.

As illustrated in FIG. 4A, in step S201, the door control device 20 initializes the obstruction counter F1 to zero (F1=0).

Because the processes of steps S202 to S208 are the same as the processes of steps S102 to S108 of FIG. 3A, their descriptions will be omitted. Also, because the states ST20 to ST22 of FIG. 4B corresponding to the processes of steps S202 to S208 are the same as the states ST10 to ST12 of FIG. 3B, their descriptions will be omitted.

On the other hand, upon obstruction being detected by the obstruction detection unit 2009 in step S204, the door control device 20 increments the obstruction counter F1 by "1" (F1=F1+1) in step S209, and causes the process to proceed to step S210.

Because the processes of steps S210 to S214 are the same as the processes of steps S110 to S114 of FIG. 3A, their descriptions will be omitted. Also, because the states ST23 and ST24 of FIG. 4B corresponding to the processes of steps S210 to S214 are the same as the states ST13 and ST14, their descriptions will be omitted.

After the process of step S212 (after setting the thrust of the motor 40 to zero), upon determining that the predetermined time Tth has elapsed in step S214, the sequence control unit 2001 determines in step S216 whether or not the obstruction lag F1 is less than a predetermined threshold value Fth1 (a positive integer). When the obstruction counter F1 is less than the predetermined threshold value Fth1, the sequence control unit 2001 returns the process to step S202. When the obstruction counter F1 is not less than the predetermined threshold value Fth1, that is, when the obstruction counter F1 is greater than or equal to the predetermined threshold value Fth1 the sequence control unit 2001 causes the process to proceed to step S218.

In step S218, by outputting a door control command b to the speed pattern generation unit 2002, the sequence control unit 2001 starts (restarts) the door opening operation of the door 60 based on speed feedback control by the speed regulator unit 2003 and thrust feedback control by the thrust regulator unit 2004, and causes the process to step S220. As a result, as illustrated in FIG. 4B, the door 60 transitions from the state ST24 in which the added thrust is off (zero) to the state ST25 corresponding to the door opening operation.

In step S220, based on door panel position information pdet, the sequence control unit 2001 determines whether or not the door panels of the door 60 have reached a predetermined fully opened position. When the door panels of the door 60 have reached the fully opened position, the sequence control unit 2001 causes the process to proceed to step S208. When the door panels of the door 60 have not reached the fully opened position, the sequence control unit 2001 causes repeats the process of this step until the door panels of the door 60 reach the fully opened position. That is, as illustrated in FIG. 4B, in the state ST24, unlike the state ST21, the door opening operation is continued until the door panels of the door 60 reach the fully opened position without depending on whether obstruction is present or absent.

As described above, in this example, the sequence control unit 2001 performs the obstruction handling control every time obstruction is detected by the obstruction detection unit 2009. Thus, when having performed the obstruction handling control by a number of times corresponding to the predetermined threshold value Fth1 (an example of a predetermined number of times), even after obstruction is detected by the obstruction detection unit 2009, the sequence control unit 2001 does not perform the obstruction handling control. Then, when the obstruction handling control has been performed by the number of times corresponding to the predetermined threshold value Fth1, the speed regulator unit 2003 and the thrust regulator unit 2004 respectively continue the speed control and the thrust control so that the door 60 reaches the fully opened position, without depending on whether or not obstruction is detected by the obstruction detection unit 2009. As a result, the door control device 20 can limit the number of times by which the obstruction handling control is performed. Therefore, by continuing to detect the obstruction, the obstruction handling control is continuously and repeatedly executed, and it is possible to avoid such a situation that an opening operation of the door 60 is not completed.

Figure 5A:
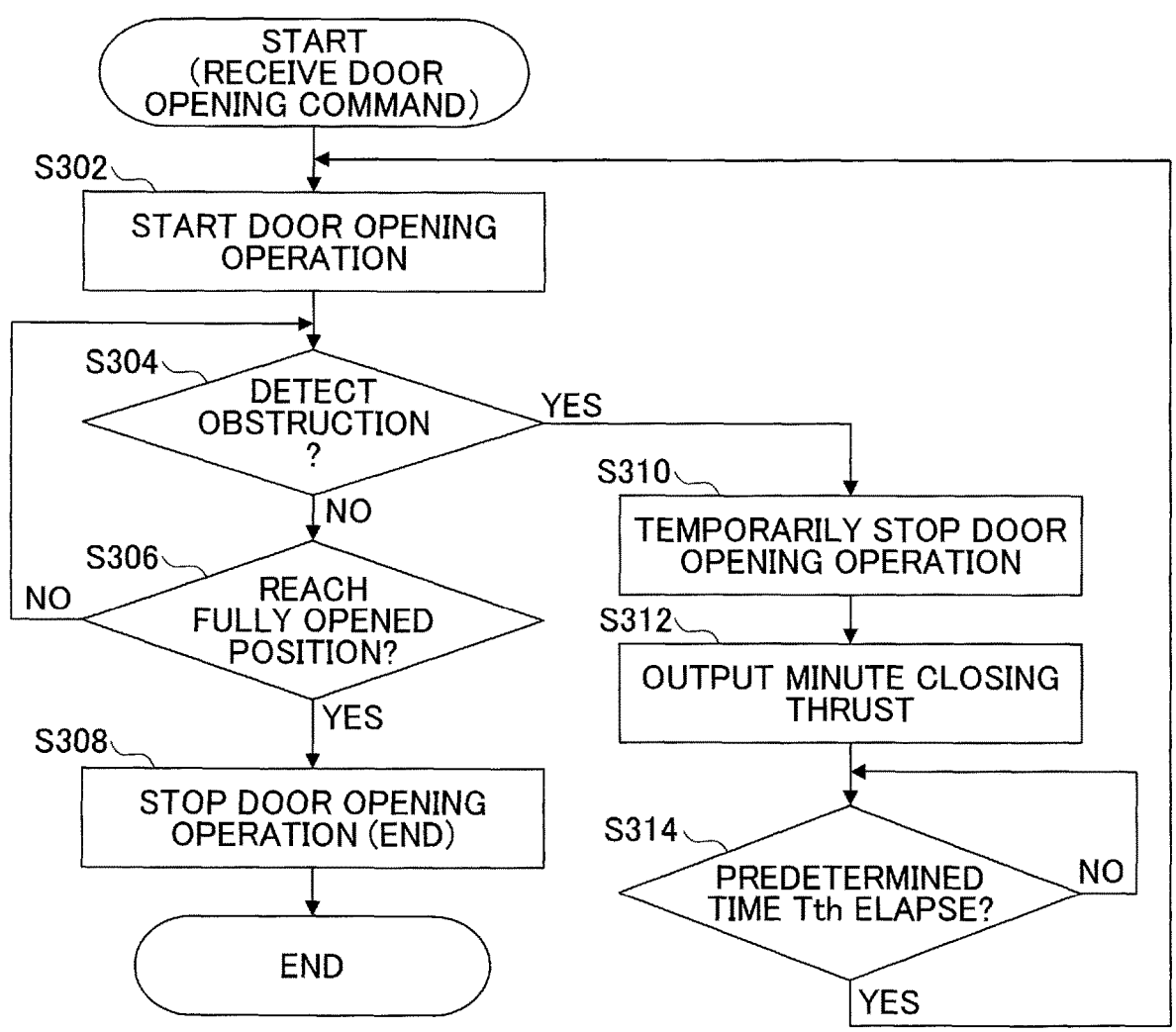
FIG. 5A is a flowchart schematically illustrating a third example of the door opening control by the door control device.
Figure 5B:
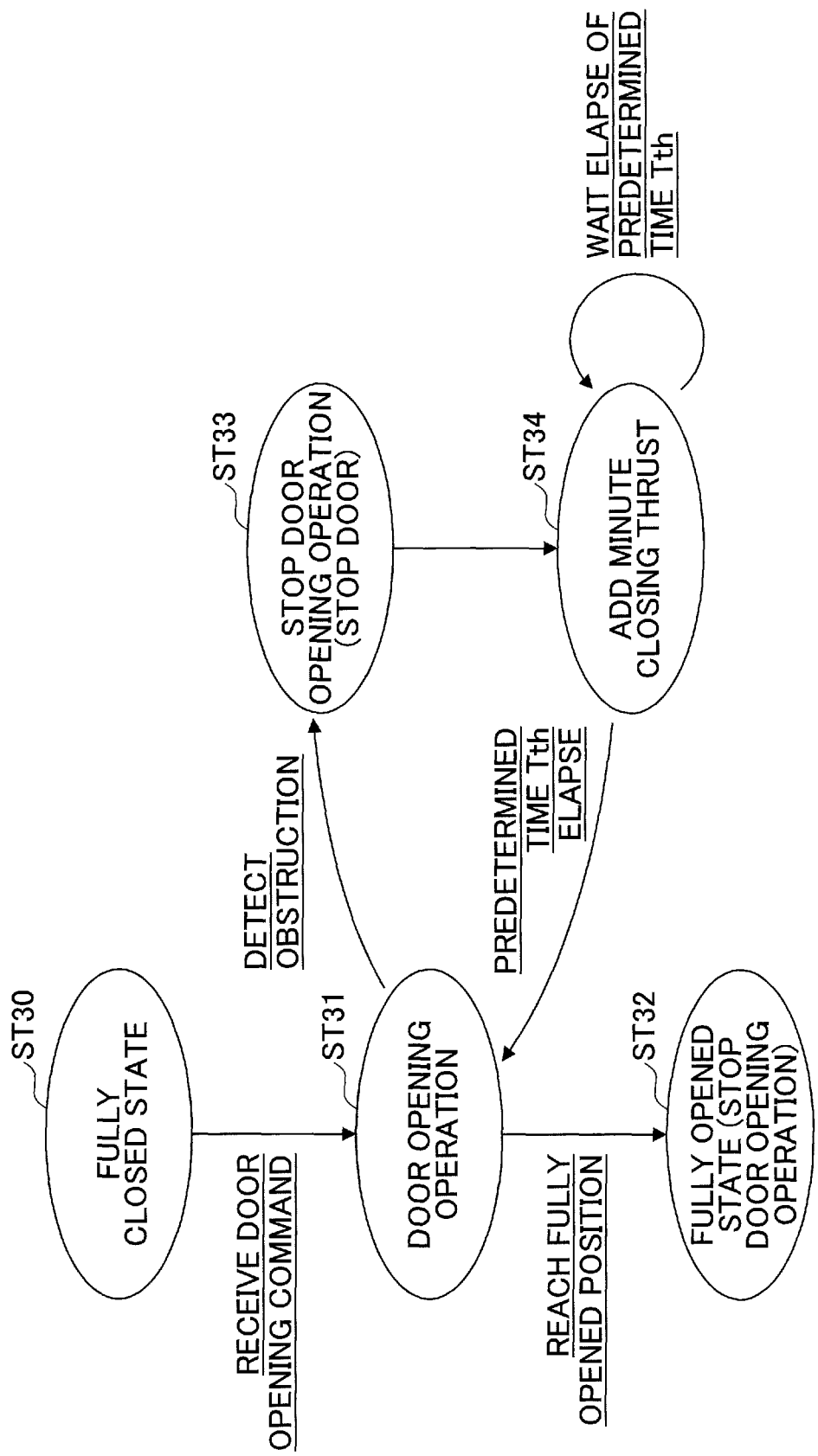
FIG. 5B is a state transition diagram relating to a state of the door behavior corresponding to the third example of the door opening control by the door control device.

Next, FIG. 5 (FIG. 5A and FIG. 5B) are diagrams that describe a third example of door opening control by the door control device 20. Specifically, FIG. 5A is a flowchart schematically illustrating the third example of the door opening control by the door control device 20. FIG. 5B is a state transition diagram relating to a movement state of the door 60 corresponding to the third example of the door opening control by the door control device 20.

As illustrated in FIG. 5A, because the processes of steps S302 to S310 are the same as the processes of steps S102 to S110 of FIG. 3A, their descriptions will be omitted. Also, because the states ST30 to ST34 of FIG. 5B corresponding to the processes of steps S302 to S310 are the same as the states ST10 to ST14 of FIG. 3B, their descriptions will be omitted.

After step S310, in step S312, the sequence control unit 2001 causes the motor 40 to output minute thrust in the closing direction of the door 60 (herein after, referred to as "minute closing thrust") to an extent that the door 60 does not operate in the closing direction, that is, to an extent that the stopped state of the door 60 is maintained by the action of an assumed steady-state drag force including a static friction force. As a result, as illustrated in FIG. 5B, the door 60 transits to the state ST 34 in which the minute closing thrust is added. Specifically, together with outputting the door control command b for operating the door 60 in the closing direction to the speed pattern generation unit 2002, the sequence control unit 2001 sets the thrust limit value flimit to a predetermined value f2 defined in advance as a value corresponding to the minute closing thrust (flimit=f2) and outputs the thrust limit value flimit to the speed regulator unit 2003. Thereby, the thrust command value fcom, which is output from the speed regulator unit 2003, is maintained in a state of reaching a peak at the predetermined value f2 corresponding to the minute closing thrust. As a result, the minute closing thrust is continuously output from the motor 40, and is added to the door 60.

At this time, the predetermined value f2 corresponding to the minute closing thrust is, for example, a relatively high value within a range of minute closing thrust assumed to maintain the stopped state of the door 60 by the action of the steady-state drag force described above, and may be preferably an upper limit value.

Because the process of step S314 is the same as the process of step S114 of FIG. 3A, its description will be omitted.

As described above, in this example, when obstruction is detected by the obstruction detection unit 2009, the sequence control unit 2001 stops the door opening operation of the door 60. Further, thereafter, during the predetermined time Tth (an example of a fourth predetermined time), the sequence control unit 2001 performs obstruction handling control to cause the motor 40 to output minute closing thrust to an extent that the stationary state of the door 60 is maintained by the action of a steady drag force including a static friction force or the like. As a result, when a passenger or the like of the car pulls out the obstructing object between the door panel and the door pocket, although it is necessary to pull out the object by a force exceeding the steady-state drag force such as the static friction force of the door 60, at least a part of the steady-state drag force is canceled by the minute closing thrust acting on the door 60. Therefore, the pulling force necessary for the passenger or the like to remove the obstructing object between the door panel and the door pocket is further reduced, and the passenger or the like can more easily remove the obstructing object.

Also, similarly to the first example or the like as described above, in this example, since the door 60 does not move in the closing direction, the door control device 20 can secure the safety of a passenger and the like.

That is, similarly to the first example or the like, the door control device 20 in this example can support a passenger to relatively easily remove an obstructing object between a door panel and a door pocket while securing the safety of the passenger or the like.

Also, in this example, minute closing thrust having a magnitude corresponding to the upper limit of a range of minute closing thrust assumed to maintain the stopped state of the door 60 by the action of the steady-state drag force including the static friction force is added from the motor 40 to the door 60. As a result, because most of the assumed steady-state drag force such as the static friction force of the door 60 is canceled, the pulling force necessary for a passenger or the like to remove the obstructing object between the door panel and the door pocket is further reduced, and the passenger or the like can more easily remove the obstructing object.

Figure 6A:
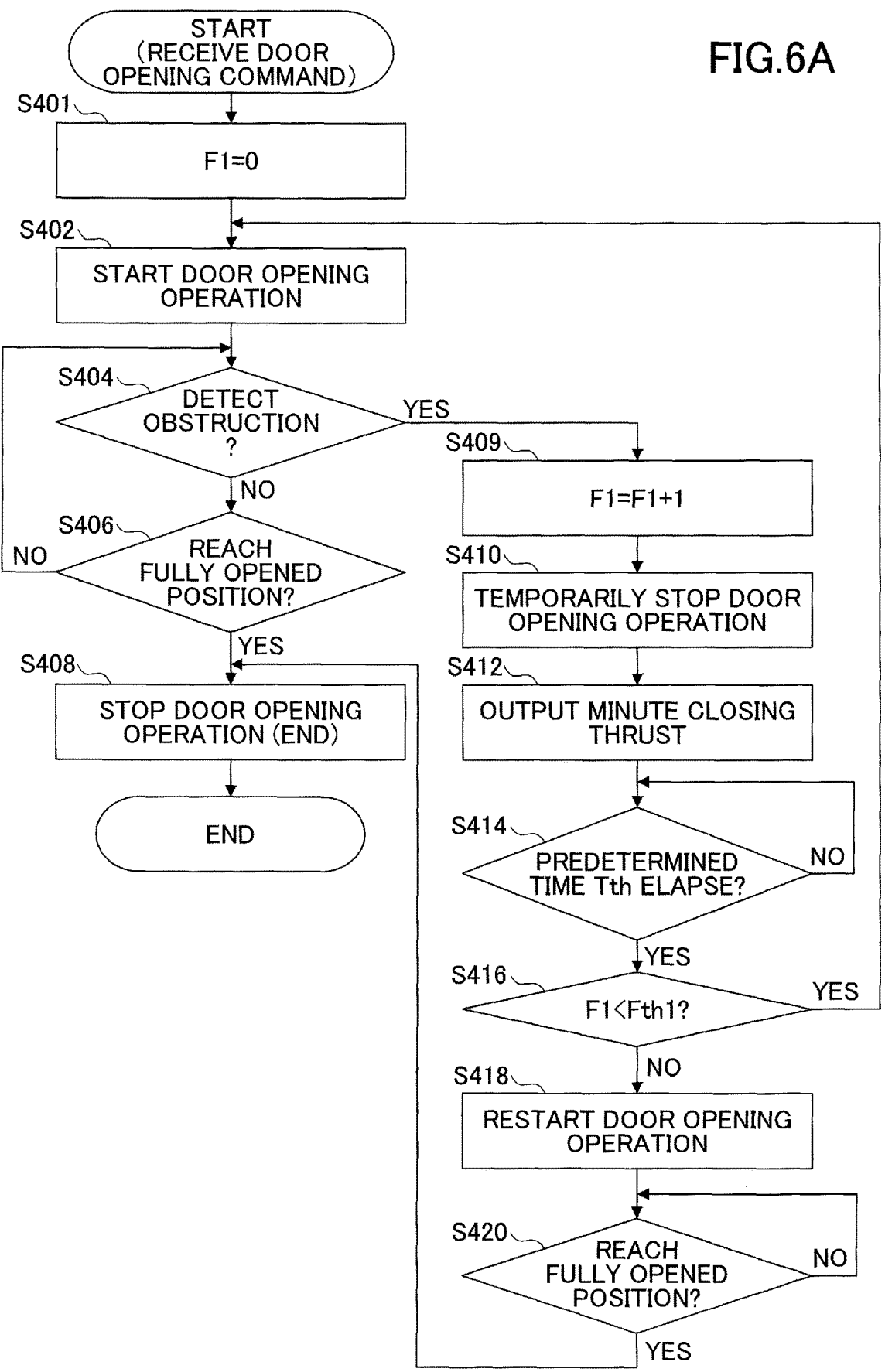
FIG. 6A is a flowchart schematically illustrating a fourth example of the door opening control by the door control device.
Figure 6B:
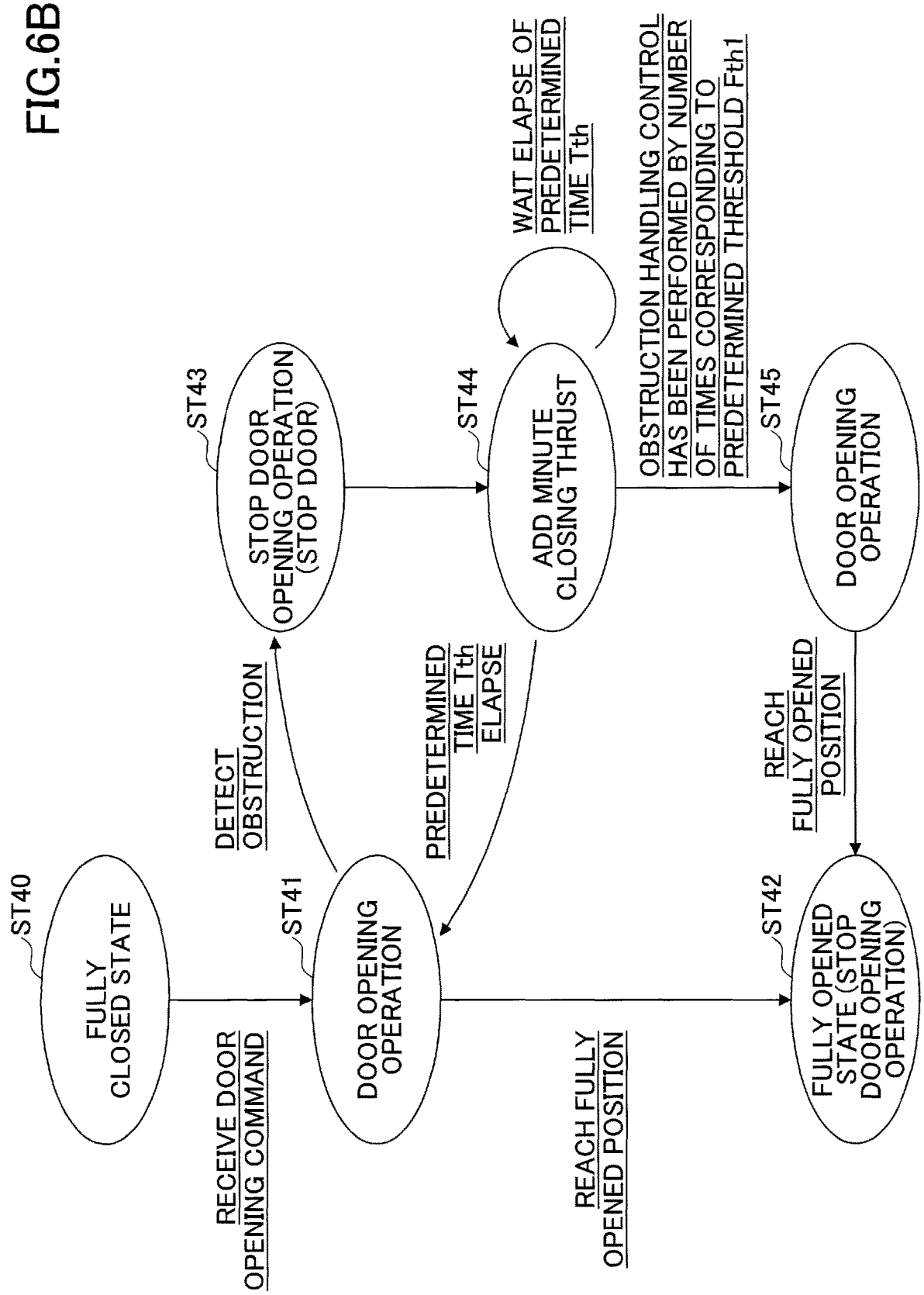
FIG. 6B is a state transition diagram relating to a state of the door behavior corresponding to the fourth example of the door opening control by the door control device.

Next, FIG. 6 (FIG. 6A and FIG. 6B) are diagrams that describe a fourth example of door opening control by the door control device 20. Specifically, FIG. 6A is a flowchart schematically illustrating the fourth example of the door opening control by the door control device 20. FIG. 6B is a state transition diagram relating to a movement state of the door 60 corresponding to the fourth example of the door opening control by the door control device 20.

As illustrated in FIG. 6A, the processes of steps S401 to S410 and S414 to S420 is the same as the processes of steps S201 to S210 and S214 to S220 of FIG. 4A. Also, the states ST40 to ST43 and ST45 of FIG. 6B corresponding to the processes of steps S401 to S410 and S414 to S420 are the same as the states ST20 to ST23 and ST25 of FIG. 4B. Also, the process of step S412 is the same as the processes of steps S312 of FIG. 5A. Also, the state ST44 of FIG. 6B corresponding to the process of steps S412 is the same as the state ST34 of FIG. 5B.

That is, in this example, similarly to the third example described above (FIG. 5A and FIG. 5B), when obstruction is detected by the obstruction detection unit 2009, the sequence control unit 2001 stops the door opening operation of the door 60. Further, thereafter, during the predetermined time Tth, the sequence control unit 2001 performs obstruction handling control to cause the motor 40 to output minute closing thrust to an extent that the stationary state of the door 60 is maintained by the action of a steady drag force including a static friction force or the like. Thereby, the door control device 20 can support a passenger to relatively easily remove an obstructing object between a door panel and a door pocket while securing the safety of the passenger or the like.

On the other hand, in this example, similarly to the second example described above (FIG. 4A and FIG. 4B), the sequence control unit 2001 performs the obstruction handling control every time obstruction of an object is detected by the obstruction detection unit 2009. Thus, when having performed the obstruction handling control by a number of times corresponding to the predetermined threshold value Fth1, even after obstruction is detected by the obstruction detection unit 2009, the sequence control unit 2001 does not perform the obstruction handling control. Then, when the obstruction handling control has been performed by the number of times corresponding to the predetermined threshold value Fth1, the speed regulator unit 2003 and the thrust regulator unit 2004 respectively continue the speed control and the thrust control so that the door 60 reaches the fully opened position, without depending on whether or not obstruction is detected by the obstruction detection unit 2009. As a result, according to the door control device 20, similarly to the case of the second example describe above, by continuing to detect the obstruction, the obstruction handling control is continuously and repeatedly executed, and it is possible to avoid such a situation that an opening operation of the door 60 is not completed.

Second Embodiment

Next, a second embodiment of the present invention will be described.

The door control device 20 according to the second embodiment is different from the first embodiment mainly in a method of detecting obstruction. In the following, portions different from the door control device 20 (door control system 1) according to the first embodiment will be mainly described.

Note that the door control device 20 according to the second embodiment can execute obstruction handling control similar to that in the first embodiment. That is, the door control device 20 according to the second embodiment can execute the obstruction handling control illustrated in FIG. 3 to. Therefore, description of the obstruction handling control of the door control device 20 according to the second present embodiment is omitted as appropriate.

[Configuration of Door Control System]

Figure 7:
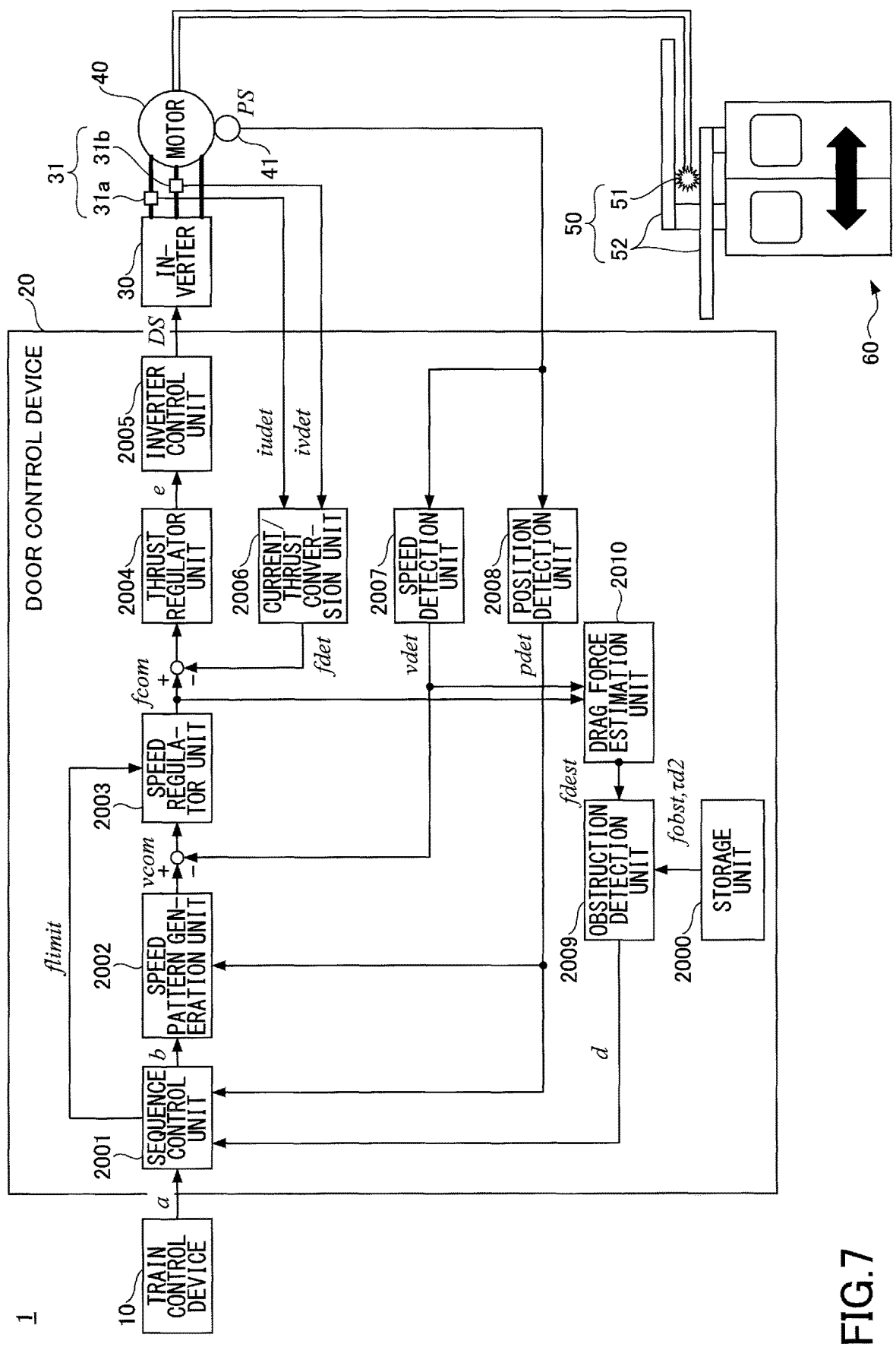
FIG. 7 is a diagram illustrating an example of a configuration of a door control system including a door control device according to a second embodiment.

First, with reference to FIG. 7, a configuration of the door control system 1 including the door control device 20 according to the second embodiment will be described.

Similarly to the first embodiment, the door control device 20 according to the second embodiment includes a sequence control unit 2001, a speed pattern generation unit 2002, a speed regulator unit 2003, a thrust regulator unit 2004, an inverter control unit 2005, a current/thrust conversion unit 2006, a speed detection unit 2007, a position detection unit 2008, and an obstruction detection unit 2009. In addition, the door control device 20 includes a drag force estimation unit 2010.

The drag force estimation unit 2010 estimates a drag force that is a cause of a speed fluctuation of the door 60. That is, the drag force estimation unit 2010 calculates a value fdest of estimating of the drag force (hereinafter, referred to as "drag force estimation value").

For example, the drag force estimation unit 2010 may be defined as a state observer that estimates a drag force that is a cause of a speed fluctuation from the thrust command value fcom or a thrust detection value fdet, and the speed detection value vdet. This is because when thrust corresponding to the thrust command value fcom is input to the door 60, the difference between the speed vest estimated (expected) by the thrust command value fcom (hereinafter referred to as "speed estimation value") and the speed detection value vdet corresponding to the speed of the door 60 actually output is affected by the drag force acting on the door 60. Specifically, the state observer corresponding to the drag force estimation unit 2010 may be defined as the following formulas (1) and (2) by using a state observation theory based on a mechanical model of the door 60 or the like. At this time, in the following formulas, s is Laplacian (Laplace operator), $k_1$ and $k_2$ are respectively regulator gains, and $T_1$ and $T_2$ are respectively time constants.

$$f_{dest} = \frac{k_2 s T_2}{1 + s T_2}(v_{est} - v_{com}) \quad (1)$$

$$v_{est} = \frac{k_1}{1 + s T_1} f_{com} \quad (2)$$

In this example, the drag force estimation value fdest is represented, using the regulator gain $k_2$ and the time constant $T_2$, as a differential element of the first-order lag with respect to the difference between the speed detection value v and the speed estimation value vest based on the thrust command value fcom.

Note that the state observer represented by the formulas (1) and (2) is an example. For example, in consideration of convergence of the drag force estimation value fdest or the like, a state observer such as Luenberger's observer may be applied to the drag force estimation unit 2010.

The drag force estimation unit 2010 can estimate, based on the formulas (1) and (2) described above, the drag force estimation value fdest that includes the steady-state drag force that constantly occurs at the door 60 including the kinetic friction force or the like and includes the disturbance drag force corresponding to obstruction or the like.

Note that the drag force estimation unit 2010 may estimate the drag force estimate fdest directly from a mechanical model (such as the equation of motion) of the door 60, for example. For example, by applying thrust of the motor 40 detected by the current/thrust conversion unit 2006, a latest speed fluctuation value of the speed detection value vdet detected by the speed detection unit 2007, a mass of the operation portion of the door 60, and the like to a mechanical model (such as the equation of motion) of the door 60, the drag force estimation unit 2010 may estimate the drag force estimate that includes the steady-state drag force and the disturbance drag force. Also, the drag force estimation unit 2010 may estimate the drag force estimation value fdest corresponding to the disturbance drag force. For example, by subtracting the amount corresponding to an assumed value of the steady-state drag force such as the kinetic friction force assumed for a driving system of the door 60 acquired through experiments, simulations, or the like, the drag force estimation unit 2010 may estimate the drag force estimation value fdest corresponding to the disturbance drag force.

[Detection Method of Obstruction During Door Opening Operation]

Next, with reference to FIG. 8, a method of detecting obstruction during a door opening operation of the door 60 by the door control device 20 (the obstruction detection unit 2009) will be described.

Figure 8:
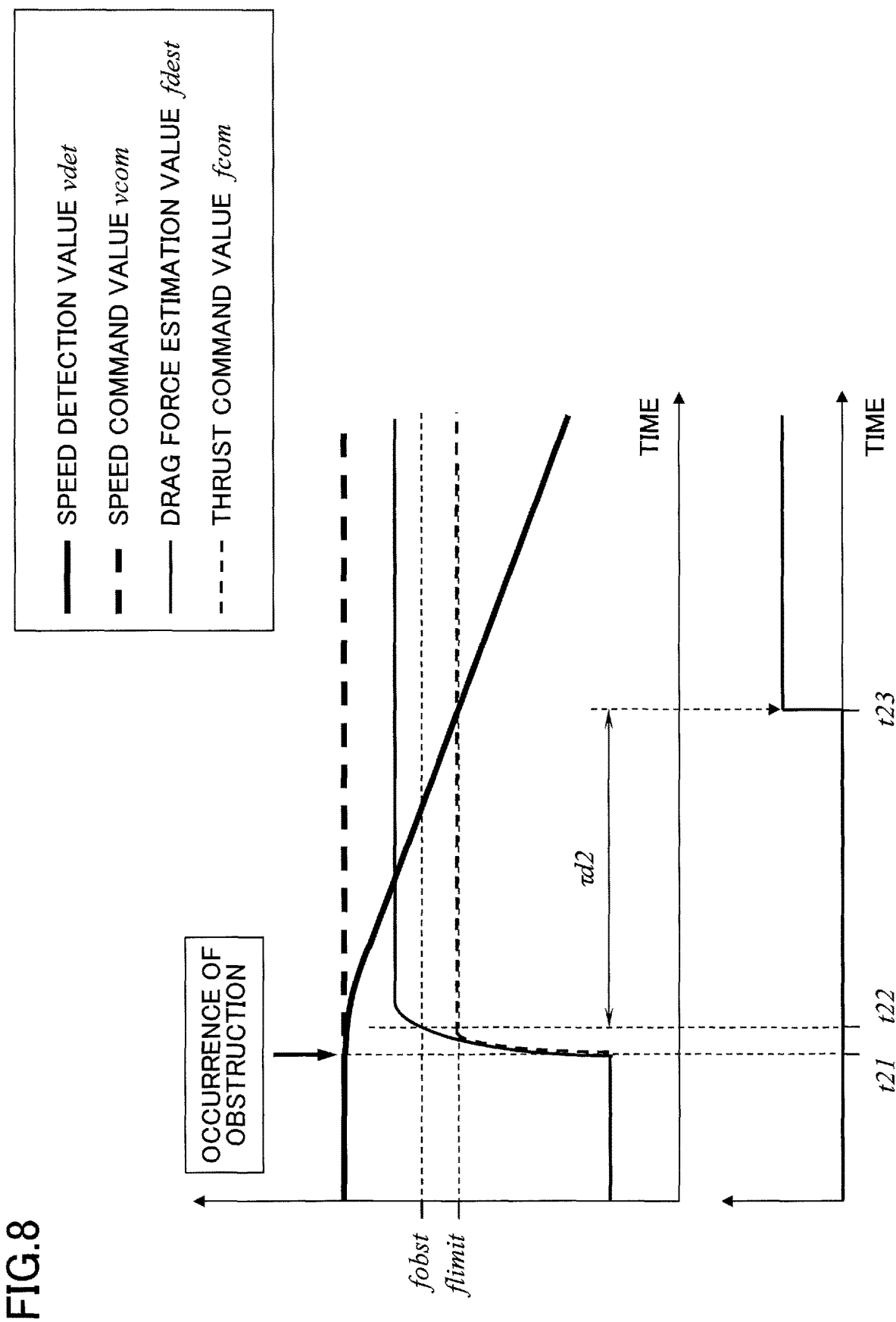
FIG. 8 is a timing chart that describes a method of detecting obstruction by the door control device according to the second embodiment.

FIG. 8 is a diagram that describes a method of detecting obstruction by the door control device 20 (the obstruction detection unit 2009). Specifically, the upper part of FIG. 8 is a graph illustrating, when obstruction, changes of a speed detection value vdet, a speed command value vcom, a drag force estimation value fdest and a thrust command value fcom with respect to time. The lower part of FIG. 8 is a graph illustrating a change of an output state (presence or absence of output) of an obstruction signal d with respect to time.

As illustrated in FIG. 8, obstruction occurs at time t21.

When the obstruction occurs, the disturbance drag force corresponding to the obstruction continues to act on the door 60. Therefore, the drag force estimation value fdest by the drag force estimation unit 2010 rapidly increases and thereafter continues to show a very large value that is substantially constant.

Therefore, upon the drag force estimation value fdest exceeding a drag force threshold value fobst (>0), the obstruction detection unit 2009 can detect the obstruction occurred at the door 60 (time t22).

In the present embodiment, instead of a decrease in the speed of the door 60 that is a result of a phenomenon of obstruction, an increase in a drag force that is a cause of a phenomenon is focused on. Therefore, at a faster timing, more specifically, even in a situation where a speed decrease can be compensated to a certain extent in the speed control system of the door 60, the door control device 20 can detect obstruction.

The drag force threshold value fobst (an example of a second predetermined value) for detecting obstruction may be defined based on the steady-state drag force including the kinetic friction force or the like acting on the door 60, for example. Specifically, the drag force threshold value fobst is defined as a value at a level assumed as the steady-state drag force including the kinetic friction force or the like acting on the door 60, for example. This is because, the drag force estimation value fdest is calculated in a manner of including the steady-state drag force, as described above.

Also, as illustrated in FIG. 8, the obstruction detection unit 2009 may determine that the drag force estimation value fdest has exceeded the drag force threshold value fobst with a time element τd2 (>0), and may detect the obstruction occurred at the door 60. That is, after the drag force estimation value fdest has exceeded the drag force threshold value fobst, when such a state continues for the time element τd2 or more, the obstruction detection unit 2009 may detect the obstruction of the object occurred at the door 60 (time t23). As a result, a case in which obstruction temporarily occurs (for example, a case in which a passenger can pull out the object dragged between a door panel and a door pocket) and the like can be eliminated. Therefore, the obstruction detection unit 2009 can detect only obstruction in a situation requiring the obstruction handling control described above.

The time element τd2 (an example of a second predetermined time) for detecting obstruction may be defined from a relationship between a probability of successfully pulling out of an object, obtained based on an empirical rule, a simulation, or the like, and an elapsed time from the occurrence of the obstruction, for example. It is considered that as the elapsed time from the occurrence of the obstruction becomes longer, the object is drawn deep into a door pocket. Thus, it is considered that as the elapsed time from the occurrence of the obstruction becomes longer, in a situation where thrust is applied to the door 60, the probability that a passenger or the like will successfully pull out the object decreases.

Although the embodiments for implementing the present invention have been described above in details, the present invention is not limited to the embodiments specifically disclosed and various variations and modifications may be made without departing from the scope of the present invention recited in the claims.

For example, although the door control device 20 controls a door that is mounted on a car in the embodiments described above, but a door other than a door that is mounted on a car may be controlled. Specifically, for example, the door control device 20 may control a door of an elevator or the like. Also, for example, by a method similar to that described above, the door control device 20 may detect obstruction during a door opening operation of a door, and may perform obstruction handling control in response to detecting obstruction of an object. Thereby, actions and effects similar to those of the embodiments described above can be obtained.

What is claimed is:

1. A door control device comprising:
   a speed control unit configured to perform speed control of an electric motor that drives a door;
   a speed detection unit configured to detect a speed of the door;
   an obstruction detection unit configured to detect obstruction between the door and a door pocket, upon a value of the speed of the door detected by the speed detection unit decreasing by greater than or equal to a predetermined value with respect to a speed command value in the speed control during a door opening operation of the door; and an obstruction handling control unit configured, upon the obstruction being detected by the obstruction detection unit during the door opening operation of the door, to stop the door opening operation without moving the door in a direction of closing the door, wherein upon obstruction of an object being detected by the obstruction detection unit during a door closing operation of the door, the obstruction handling control unit is configured to move the door in a direction of opening the door so that the object is removable.

2. The door control device according to claim 1, wherein the obstruction detection unit detects the obstruction during the door opening operation, upon a state where the value of the speed of the door detected by the speed detection unit decreases by greater than or equal to the predetermined value with respect to the speed command value during the door opening operation of the door continuing for greater than or equal to a predetermined time.

3. The door control device according to claim 2, wherein the predetermined time is defined based on at least one of a magnitude of the speed command value, a steady-state error of a speed control system corresponding to the speed control, a disturbance response of the speed control system, and a magnitude of a speed fluctuation of the speed control system.

4. The door control device according to claim 1, wherein the predetermined value is defined based on at least one of a magnitude of the speed command value, a steady-state error of a speed control system corresponding to the speed control, a disturbance response of the speed control system, and a magnitude of a speed fluctuation of the speed control system.

5. The door control device according to claim 1,
wherein the obstruction handling control unit is configured, when the obstruction is detected by the obstruction detection unit during the door opening operation, to stop the door opening operation of the door and thereafter to perform, during a predetermined time, obstruction handling control of setting thrust of the electric motor to zero.

6. The door control device according to claim 5, wherein, during the door opening operation of the door, every time the obstruction is detected by the obstruction detection unit during the door opening operation, the obstruction handling control unit performs the obstruction handling control, and when the obstruction handling control has been performed by a predetermined number of times, the speed control unit continues the speed control so that the door reaches a fully opened position without depending on whether or not the obstruction is detected by the obstruction detection unit during the door opening operation.

7. The door control device according to claim 1,
wherein the obstruction handling control unit is configured, when the obstruction is detected by the obstruction detection unit during the door opening operation, to stop the door opening operation of the door and thereafter to perform, during a predetermined time, obstruction handling control of causing the electric motor to output minute thrust in a direction of closing the door to an extent that a stopped state of the door is maintained by an action of an assumed steady-state drag force including a static friction force.

8. The door control device according to claim 7, wherein, when the obstruction is detected by the obstruction detection unit during the door opening operation, the obstruction handling control unit stops the door opening operation of the door and, during the predetermined time, causes the electric motor to output the minute thrust having a magnitude corresponding to an upper limit of a range of the minute thrust assumed to maintain the stopped state of the door by the action of the steady-state drag force.

9. The door control device according to claim 1, wherein the door is a door that is provided on a car.

10. The door control device according to claim 9, wherein the car is a railroad car.

11. A door control device comprising:
a speed control unit configured to perform speed control of an electric motor that drives a door;
a drag force estimation unit configured to estimate a drag force that is a cause of a variation in the door speed;
an obstruction detection unit configured to detect obstruction between the door and a door pocket, upon the drag force estimated by the drag force estimation unit exceeding a predetermined value during a door opening operation of the door; and
an obstruction handling control unit configured, upon the obstruction being detected by the obstruction detection unit during the door opening operation of the door, to stop the door opening operation without moving the door in a direction of closing the door,
wherein upon obstruction of an object being detected by the obstruction detection unit during a door closing operation of the door, the obstruction handling control unit is configured to move the door in a direction of opening the door so that the object is removable.

12. The door control device according to claim 11, wherein the obstruction detection unit detects the obstruction, upon a state where the drag force estimated by the drag force estimation unit exceeds the predetermined value during the door opening operation of the door continuing for greater than or equal to a predetermined time.

13. The door control device according to claim 11,
wherein the drag force estimation unit estimates the drag force including a steady-state drag force that constantly occurs and including a disturbance drag force corresponding to the obstruction, the steady-state drag force including a kinetic friction force, and
wherein the predetermined-value is defined based on the steady-state drag force assumed for a time of the door opening operation of the door.

14. The door control device according to claim 13, further comprising:
a speed detection unit configured to detect a speed of the door; and
a thrust control unit configured to perform thrust control of the electric motor based on a thrust command value, which is output from the speed control unit based on a speed command value,
wherein the drag force estimation unit is a state observer that estimates the drag force by using, as inputs, a value of the speed of the door detected by the speed detection unit and the thrust command value or the detected thrust value.

15. A door control method that is executed by a door control device configured to drive and control a door, the method comprising:
a speed control step of performing speed control of an electric motor that drives the door; and
a speed detection step of detecting a speed of the door;
an obstruction detection step of detecting obstruction of an object between the door and a door pocket, upon a value of the speed of the door detected in the speed detection step decreasing by greater than or equal to a predetermined value with respect to a speed command value in the speed control during a door opening operation of the door;

an obstruction handling control step, upon the obstruction being detected in the obstruction detection step during the door opening operation of the door, of stopping the door opening operation without moving the door in a direction of closing the door; and upon obstruction of an object being detected during a door closing operation of the door, a step of moving the door in a direction of opening the door so that the object is removable.

16. A door control method that is executed by a door control device configured to drive and control a door, the method comprising:

a speed control step of performing speed control of an electric motor that drives the door;

a drag force estimation step of estimating a drag force that is a cause of a speed fluctuation of the door;

an obstruction detection step of detecting obstruction between the door and a door pocket, upon the drag force estimated in the drag force estimation step exceeding a predetermined value during a door opening operation of the door;

an obstruction handling control step, upon the obstruction being detected in the obstruction detection step during the door opening operation of the door, of stopping the door opening operation without moving the door in a direction of closing the door; and upon obstruction of an object being detected during a door closing operation of the door, a step of moving the door in a direction of opening the door so that the object is removable.

* * * * *